(12) United States Patent
Müller et al.

(10) Patent No.: US 7,320,563 B2
(45) Date of Patent: Jan. 22, 2008

(54) TWO-CAVITIES CUTTING MATRIX

(75) Inventors: Matthias Müller, Kirchheim/Teck (DE); Wolfgang Zitzlaff, Kirchheim/Teck (DE)

(73) Assignee: Ceramtec AG, Innovative Ceramic Engineering, Plochingen (DE)

( * ) Notice: Subject to any disclaimer, the term of this patent is extended or adjusted under 35 U.S.C. 154(b) by 145 days.

(21) Appl. No.: 10/524,763

(22) PCT Filed: Aug. 25, 2003

(86) PCT No.: PCT/EP03/09397

§ 371 (c)(1),
(2), (4) Date: Apr. 26, 2005

(87) PCT Pub. No.: WO2004/024379

PCT Pub. Date: Mar. 25, 2004

(65) Prior Publication Data

US 2005/0186039 A1    Aug. 25, 2005

(30) Foreign Application Priority Data

Aug. 28, 2002   (DE) .............................. 102 39 451

(51) Int. Cl.
   *B23B 27/22*   (2006.01)
(52) U.S. Cl. .................. 407/113; 407/102; 407/107; 407/109; 407/111
(58) Field of Classification Search .............. 407/102, 407/106, 107, 109, 111, 113; *B23B 27/22*
See application file for complete search history.

(56) References Cited

U.S. PATENT DOCUMENTS

| | | | |
|---|---|---|---|
| 26,168 A * | 11/1859 | Lundgren | 405/1 |
| 3,156,032 A | 11/1964 | Gustav | |
| 4,480,950 A | 11/1984 | Kraft et al. | |
| 4,963,061 A * | 10/1990 | Katbi et al. | 407/114 |
| 5,044,840 A * | 9/1991 | Fouquer et al. | 407/114 |
| 6,017,172 A * | 1/2000 | Ukegawa et al. | 407/113 |
| 6,609,859 B1 * | 8/2003 | Sjoo | 407/103 |
| 2003/0086766 A1 * | 5/2003 | Andras | 407/102 |
| 2004/0101373 A1 * | 5/2004 | Isaksson et al. | 407/103 |
| 2004/0256608 A1 * | 12/2004 | Eder et al. | 254/401 |

FOREIGN PATENT DOCUMENTS

| | | | |
|---|---|---|---|
| DE | 19854873 A1 * | 5/2000 | |
| EP | 0 9001 995 A | 3/1999 | |
| GB | 1567004 A * | 5/1980 | |
| JP | 2000117512 A * | 4/2000 | |
| WO | WO 9930860 A1 * | 6/1999 | |

* cited by examiner

*Primary Examiner*—Monica Carter
*Assistant Examiner*—Sara Addisu
(74) *Attorney, Agent, or Firm*—Fulbright & Jaworski L.L.P.

(57) ABSTRACT

A cutting matrix has a top surface, a first cavity for tightening the cutting matrix in a cutting tool, and a cutting edge for cutting by stock removal. A second tightening cavity is arranged coaxially with respect to the first cavity. The first cavity is deeper than the second, and both are below the upper surface of the cutting matrix.

61 Claims, 5 Drawing Sheets

TWO-CAVITIES CUTTING MATRIX

This is a §371 of PCT/EP2003/009397 filed Aug. 25, 2003, which claims priority from German 102 39 451.2 filed Aug. 28, 2002.

The invention relates to a cutting plate for clamping in a cutting tool for machining cast materials, having a cutting-plate upper side, a first clamping trough for the clamping in the cutting tool, and a cutting edge for metal-removing processing, and to the associated cutting tool.

An indexable cutting plate made from ceramic material for clamping in a cutting tool for machining cast materials, in particular cast iron, is known from EP 0 075 177. On its upper side the cutting plate contains a trough or clamping surface for engagement of a clamping claw or a gripping finger of a cutting tool, with each corner of the indexable cutting plate having a cutting edge.

The cutting tool accordingly consists of a gripping holder and an exchangeable cutting plate that is to be inserted into the gripping holder. The cutting plate is that portion that acts on the work piece and processes it, removing metal. The cutting plate must therefore be made of extremely hard material, the abrasion of which is as low as possible when metallic work pieces are processed.

Materials that meet these requirements are oxide-ceramic materials, such as aluminium oxide or zirconium oxide, for example. Such ceramic materials have a very high level of hardness and pressure-resistance, yet only limited tensile strength.

The prior art is accordingly constituted by a cutting plate or a cutting insert, or indexable cutting plate, that is inserted in a carrier tool for machining metallic materials. This can be secured in the carrier tool in a variety of ways. One method of securement is by means of a clamping grip that presses the indexable cutting plate from above downwards into the plate seat. In this connection, the important force component that is to draw the indexable cutting plate into the plate-seat corner, that is, also towards the clamping grip, is very small. This is remedied here by a trough or a bore into which the clamping grip projects and as a result of its clamping force greatly increases the force component to the plate-seat corner. When gripping by way of a trough the shape of the trough and the clamping elements is of significance. A change in the trough shape at the indexable cutting plate, for example as a result of grinding or lapping the surface or supporting surfaces, impairs or prevents optimum clamping of the indexable cutting plate by way of the clamping elements.

The underlying object of the invention is to improve a cutting plate in accordance with the present invention in such a way that processing the cutting-plate upper side by lapping or grinding does not affect the gripping properties of the cutting plate. In accordance with the invention, this object is achieved by arranging a second clamping trough coaxially with respect to the first clamping trough, with the first clamping trough being arranged so that it is deeper than the second clamping trough and both being arranged so that they are deeper than the cutting-plate upper side. As a result, the vertical spacing of the first clamping trough from the second clamping trough is always the same, even when the cutting-plate upper side is processed by grinding or lapping.

The trough shape of the first and/or the second clamping trough can be round, oval, angular, polygonal or star-shaped. However, other geometrical shapes are also possible.

Advantageously, the trough shape of the first clamping trough forms a surface that is parallel to the cutting-plate upper side or is formed so that it is trough-shaped.

An elevation is preferably arranged in the first clamping trough.

A preferred embodiment is distinguished in that the trough shape of the second clamping trough 12 forms a surface that is parallel to the cutting-plate upper side 13 or is an elevation.

In this connection, the elevation can be formed so that it is annular.

The cutting plate is advantageously made of ceramic material. However, other embodiments in hard metal are also expedient.

The cutting plate is preferably an indexable or reversible cutting plate, that is, the two sides of the cutting plate are formed so that they are identical.

The two clamping troughs have advantageously been introduced during production by means of a pressing process.

The double trough that is introduced and has, in addition to the trough that accommodates the clamping grip, a second trough as well surrounding the first trough and is introduced, for example, during the pressing, is accordingly considered to be a special feature of this invention. Since both troughs, on account of their dimensions and positional tolerances, lie below the cutting-plate upper surface or supporting surface or cutting-plate upper side and are pressed in too during the production, they are not changed by necessary grinding or lapping processing operations. The thickness tolerance of the cutting plate or the observance of this does not affect the trough shape. Thus at any time this renders possible an optimum position of the clamping elements and the distribution of the clamping force with specific distribution of the force components onto the cutting plate.

Further features of the invention follow from the figures which are described below and in which.

Figure 1:
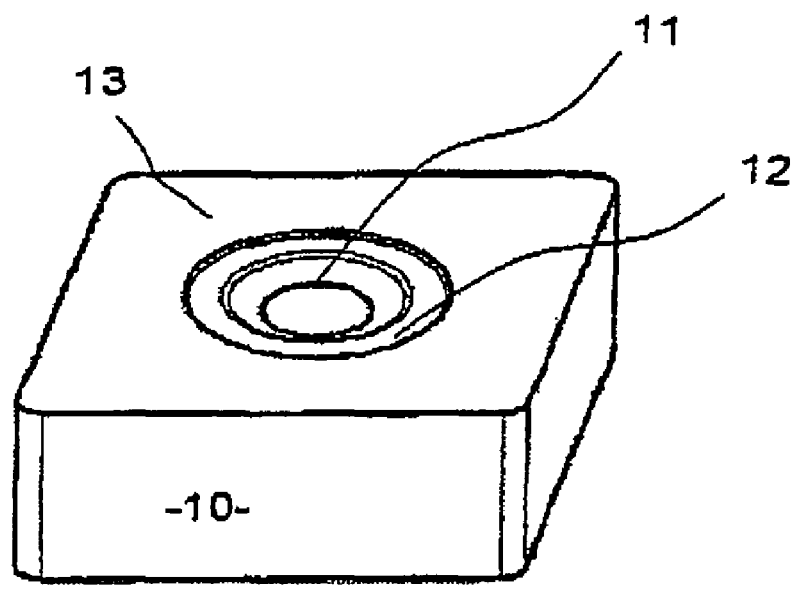
FIG. 1 shows a view of the cutting plate in accordance with the invention.

FIG. 1 shows a cutting plate 10, in particular an indexable cutting plate for metal-removing processing of metallic work pieces, substantially characterised in that the cutting plate has in the centre a clamping trough 11, with a further clamping trough 12 being placed around the latter. This lower clamping trough 11 is to be used for fixing the cutting plate by means of clamping elements in an appropriate receiver, called plate seat here, on a suitable carrier tool. The upper clamping trough 12 that can additionally take up clamping forces of the clamping elements is to be mentioned as a special feature of this invention. Both clamping troughs 11, 12 lie below the cutting-plate upper side 13 that is also referred to as a supporting surface.

Figure 2:
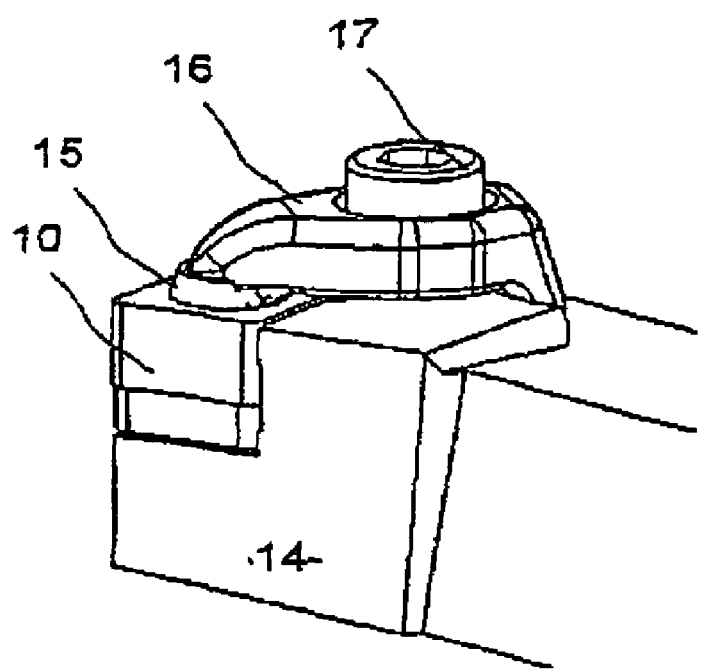
FIG. 2 shows a cutting plate in accordance with the invention, clamped in a cutting tool.

FIG. 2 shows the spatial representation of the described cutting plate 10 in the clamped state on a carrier tool 14.

One possibility of clamping in this connection is by way of a pressure piece 15 which is connected to the clamping claw 16 and on the underside has the counter-form of the previously described clamping trough in the cutting plate. The clamping force that develops as a result of tightening the clamping screw 17 is transferred to the cutting plate by way of the clamping claw 16 and the pressure plate 15. The clamping claw 16 can also directly have the matching shape for the trough, that is, it is also possible to dispense with a pressure piece 15 in this case. This is to be determined according to the case of application and trough shape.

Figure 3:
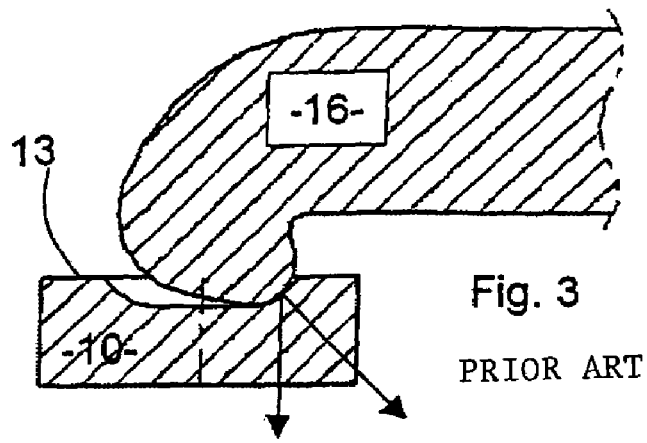
FIG. 3 shows a grip in accordance with the prior art.

FIG. 3 shows a conventional grip where the clamping claw 16 engages into the trough of the cutting plate 10. The contact point and the clamping-force direction are characterised by arrows. There is only a line contact in the trough. The pressure force is concentrated on a small area that can damage the cutting plate 10. Processing the cutting-plate upper side 13 does not affect the clamping trough.

Figure 4:
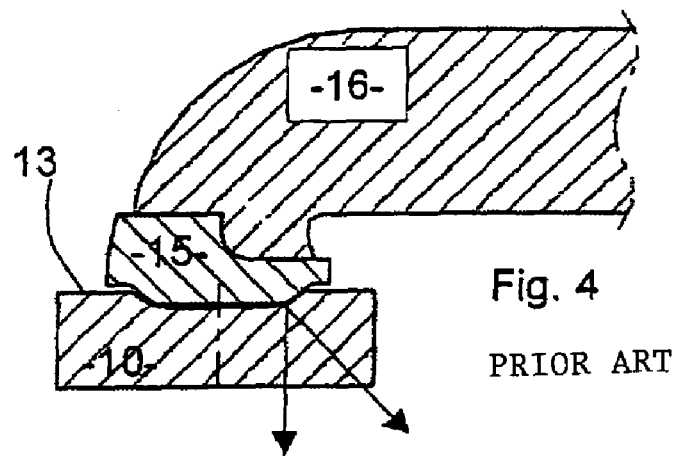
FIG. 4 shows an alternative grip in accordance with the prior art.

FIG. 4 shows a conventional grip with a clamping claw 16 and pressure plate 15 secured thereon. The force-distribution is as far from optimal as in FIG. 3. Processing the cutting-plate upper side 13 does not affect the clamping trough in this case either. The contact zone between the pressure plate 15 and the cutting plate 10 is, however, also more a line contact.

Figure 5:
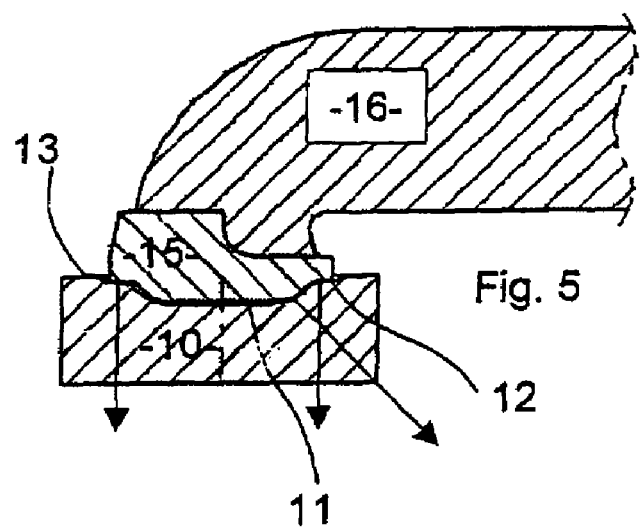
FIG. 5 shows a grip with a double trough in accordance with the invention.

FIG. 5 shows a grip with a double trough in accordance with the invention, with a clamping claw 16 and a pressure plate 15. The upper region of the pressure plate lies in the upper trough 12; the lower region of the pressure plate 15 lies in the lower trough 11. The change in the cutting-plate upper side 13 does not change the spacing of the clamping troughs 11, 12 from each other. The contact zone between the pressure plate 15 and the cutting plate 10 occurs over the whole surface of the contact area in the upper clamping trough 12. Thus at any time there is optimum force-distribution of the clamping forces over the whole surface. These forces in turn are characterised by the arrows.

Figure 6:
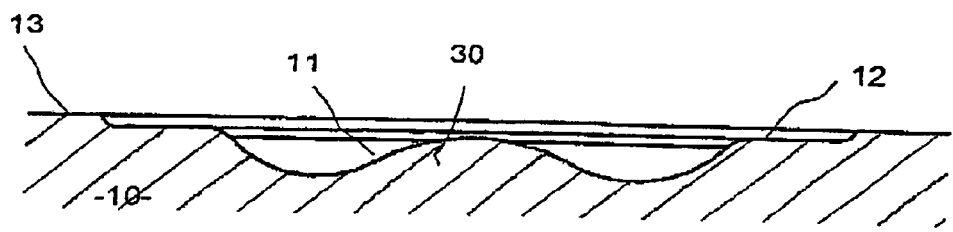
FIG. 6 shows a cross section through a cutting plate in accordance with the invention.

FIG. 6 shows a cross section through the centre of a cutting plate 10 in accordance with the invention. In this connection two depressions can be seen. Special features here are that the clamping trough 12 lies below the surface or supporting surface 13, and the deeper trough 11 in turn lies below the trough 12. An elevation 30 is arranged in the centre of the first clamping trough 11.

Figure 7:
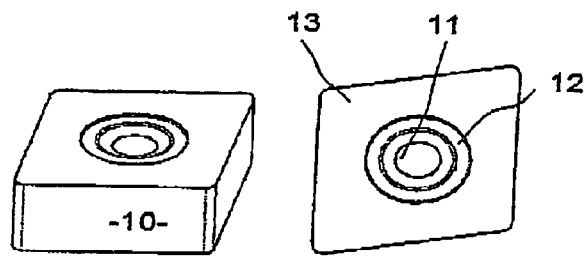
FIGS. 7-12 show embodiments of the cutting plate in accordance with the invention.
Figure 8:
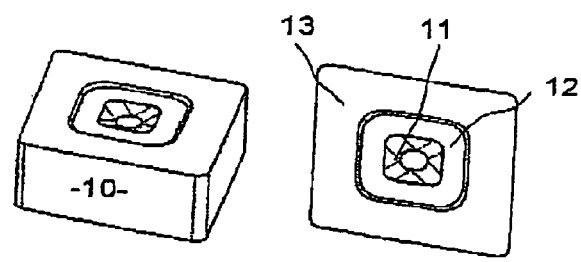

FIGS. 7 to 8 show that the trough shape can have a variety of variations, such as round, oval, angular, polygonal or star-shaped. The central portion 11, however, always lies below the outer portion 12 that surrounds it, which outer portion 12 in turn lies below the surface 13.

Figure 9:
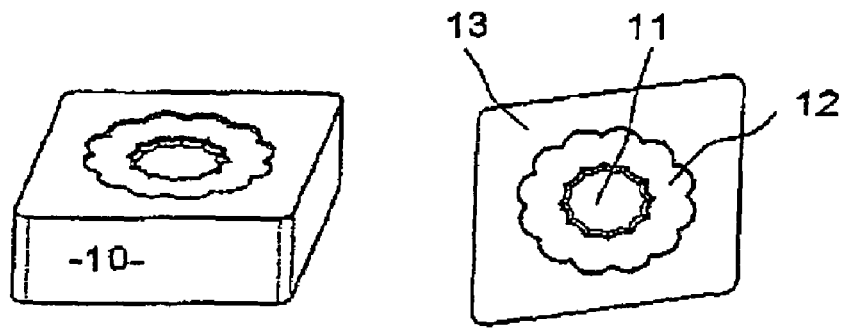
Figure 10:
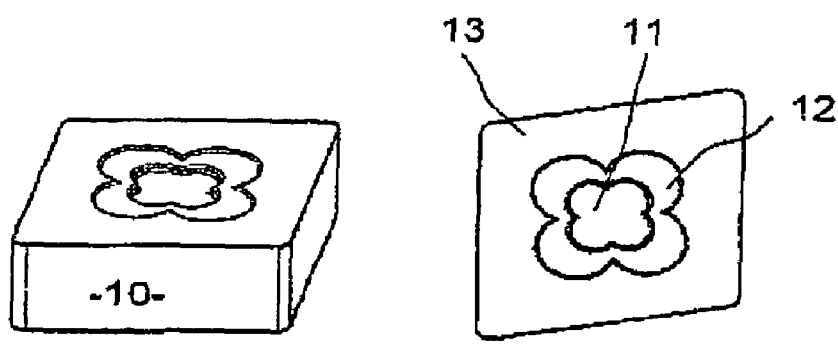
Figure 11:
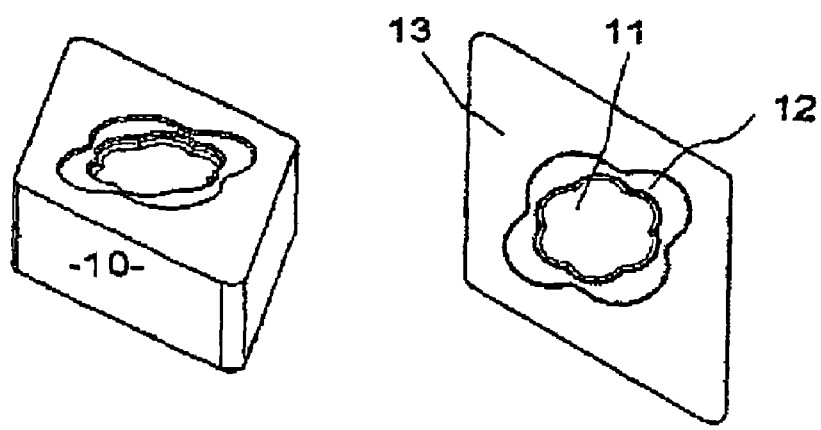

FIGS. 9 to 11 shows further possible trough shapes. The common, special feature is the central portion 11 that always lies below the outer portion 12 that surrounds it, which outer portion 12 in turn lies below the surface 13.

Figure 12:
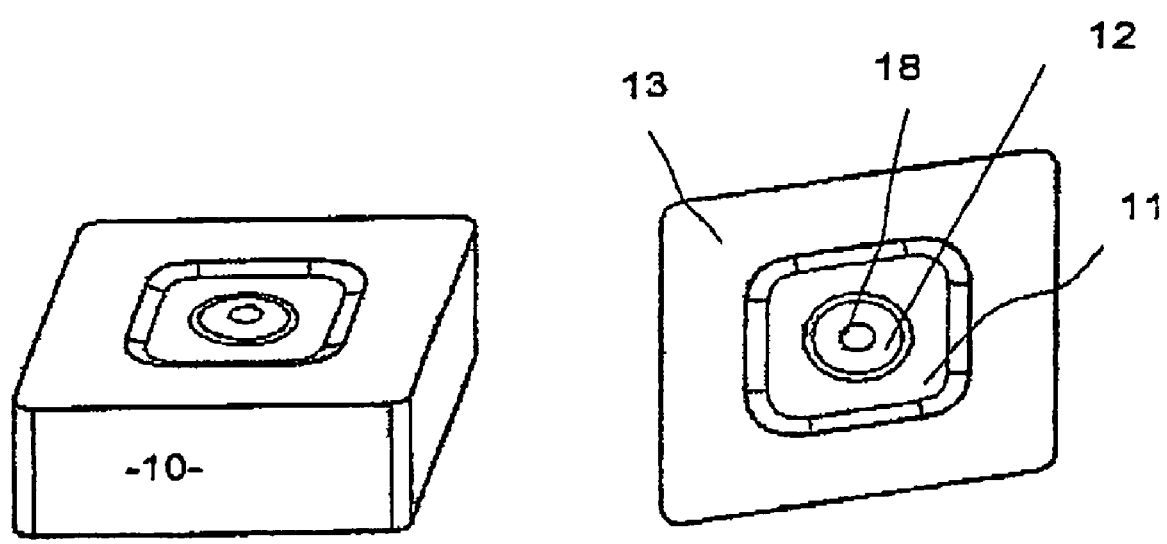

FIG. 12 shows another possible trough feature. The special feature of this trough form is the depression or clamping trough 11 that always lies below the surface or cutting-plate upper side 13. Coaxially arranged in its centre is the second clamping trough 12 which with its highest point 18 stands below the surface 13, yet above the trough 11 that surrounds it. Here as well the shape for the trough 11 can again be varied, such as round, oval, angular or star-shaped. Moreover, irrespective thereof the shape of the elevation 18 can also have a variety of forms. In this embodiment, the elevation 18 is formed so that it is annular.

The invention claimed is:
1. A cutting plate comprising:
an upper side;
a first clamping trough extending from said upper side for clamping in a cutting tool;
a cutting edge for metal-removing processing;
a second clamping trough extending from said upper side and arranged coaxially with respect to the first clamping trough,
wherein said first clamping trough is arranged so that it is deeper than the second clamping trough and both said first clamping trough and said second clamping trough are arranged so that they are deeper than said cutting-plate tipper side, wherein a trough shape of the second clamping trough forms a surface that is parallel to the cutting plate upper side.

2. A cutting plate according to claim 1, wherein the trough shape of at least one of said first or second clamping troughs is round, oval, angular, polygonal or star-shaped.

3. A cutting plate according to claim 2, wherein a trough shape of said lint clamping trough forms a surface that is parallel to said culling-plate upper side or is formed so that it is trough-shaped.

4. A cutting plate according to claim 3, wherein an elevation is arranged in the first clamping trough.

5. A cutting plate according to claim 4, wherein a trough shape of the second clamping trough is round.

6. A cutting plate according to claim 5, having an elevation in the center of the first clamping trough that is annular.

7. A cutting plate according to claim 6, wherein said cutting plate comprises a ceramic material.

8. A cutting plate according to claim 6, wherein said cutting plate is an indexable cutting plate.

9. A cutting plate according to claim 5, wherein said cutting plate comprises a ceramic material.

10. A cutting plate according to claim 5, wherein said cutting plate is an indexable cutting plate.

11. A cutting plate according to claim 4, wherein the elevation is annular.

12. A cutting plate according to claim 11, wherein said cutting plate comprises a ceramic material.

13. A cutting plate according to claim 11, wherein said cutting plate is an indexable cutting plate.

14. A cutting plate according to claim 4, wherein said cutting plate comprises a ceramic material.

15. A cutting plate according to claim 4, wherein said cutting plate is an indexable cutting plate.

16. A cutting plate according to claim 3, wherein a trough shape of the second clamping trough is round.

17. A cutting plate according to claim 16, wherein said cutting plate comprises a ceramic material.

18. A cutting plate according to claim 16, wherein said cutting plate is an indexable cutting plate.

19. A cutting plate according to claim 3, having an elevation in the center of the first clamping trough that is annular.

20. A cutting plate according to claim 19, wherein said cutting plate comprises a ceramic material.

21. A cutting plate according to claim 19, wherein said cutting plate is an indexable cutting plate.

22. A cutting plate according to claim 3, wherein said cutting plate comprises a ceramic material.

23. A cutting plate according to claim 3, wherein said cutting plate is an indexable cutting plate.

24. A cutting plate according to claim 2, having an elevation in the center of the first clamping trough that is annular.

25. A cutting plate according to claim 24, wherein said cutting plate comprises a ceramic material.

26. A cutting plate according to claim 24, wherein said cutting plate is an indexable cutting plate.

27. A cutting plate according to claim 2, wherein said cutting plate comprises a ceramic material.

28. A cutting plate according to claim 2, wherein said cutting plate is an indexable cutting plate.

29. A cutting plate according to claim 1, wherein a trough shape of said first clamping trough forms a surface that is parallel to said cutting-plate upper side or is formed so that it is trough-shaped.

30. A cutting plate according to claim 29, wherein an elevation is arranged in the first clamping trough.

31. A cutting plate according to claim 30, wherein a trough shape of the second clamping trough is round.

32. A cutting plate according to claim 31, wherein said cutting plate comprises a ceramic material.

33. A cutting plate according to claim 31, wherein said cutting plate is an indexable cutting plate.

34. A cutting plate according to claim 30, wherein the elevation is annular.

35. A cutting plate according to claim 34, wherein said cutting plate comprises a ceramic material.

36. A cutting plate according to claim 34, wherein said cutting plate is an indexable cutting plate.

37. A cutting plate according to claim 30, wherein said cutting plate comprises a ceramic material.

38. A cutting plate according to claim 30, wherein said cutting plate is an indexable cutting plate.

39. A cutting plate according to claim 29, having an elevation in the center of the first clamping trough that is annular.

40. A cutting plate according to claim 39, wherein said cutting plate comprises a ceramic material.

41. A cutting plate according to claim 39, wherein said cutting plate is an indexable cutting plate.

42. A cutting plate according to claim 29, wherein said cutting plate comprises a ceramic material.

43. A cutting plate according to claim 29, wherein said cutting plate is an index able cutting plate.

44. A cutting plate according to claim 1, wherein a trough shape of the second clamping trough is round.

45. A cutting plate according to claim 44, wherein said cutting plate comprises a ceramic material.

46. A cutting plate according to claim 44, wherein said cutting plate is an indexable cutting plate.

47. A cutting plate according to claim 1, wherein a trough shape of the second clamping trough is oval.

48. A cutting plate according to claim 47, wherein said cutting plate comprises a ceramic material.

49. A cutting plate according to claim 47, wherein said cutting plate is an indexable cutting plate.

50. A cutting plate according to claim 1, wherein an elevation is arranged in the center of the first clamping trough.

51. A cutting plate according to claim 50, wherein said cutting plate comprises a ceramic material.

52. A cutting plate according to claim 50, wherein said cutting plate is an indexable cutting plate.

53. A cutting plate according to claim 1, wherein said cutting plate comprises a ceramic material.

54. A cutting plate according to claim 53, wherein said cutting plate is an indexable cutting plate.

55. A cutting plate according to claim 1, wherein said cutting plate is an indexable cutting plate.

56. A cutting plate according to claim 1, wherein said first and said second clamping troughs have been introduced during production by a pressing process.

57. A cutting tool comprising a cutting plate according to claim 1 and a clamping claw to hold said cutting plate by securing the cutting plate in at least the first clamping trough of the cutting plate.

58. A cutting plate comprising:
an upper side;
a cutting edge;
a first clamping trough in said upper side;
an elevation in said first clamping trough;
a second clamping trough in said upper side and arranged coaxially with respect to the first clamping trough;
wherein said first clamping trough is arranged deeper than the second clamping trough, and both said first and said second clamping troughs are arranged below the upper side.

59. The cutting plate of claim 58, wherein said elevation is arranged in the center of the first clamping trough.

60. The cutting plate of claim 59 comprising a ceramic material.

61. The cutting plate of claim 58 comprising a ceramic material.

* * * * *